Figure 1:
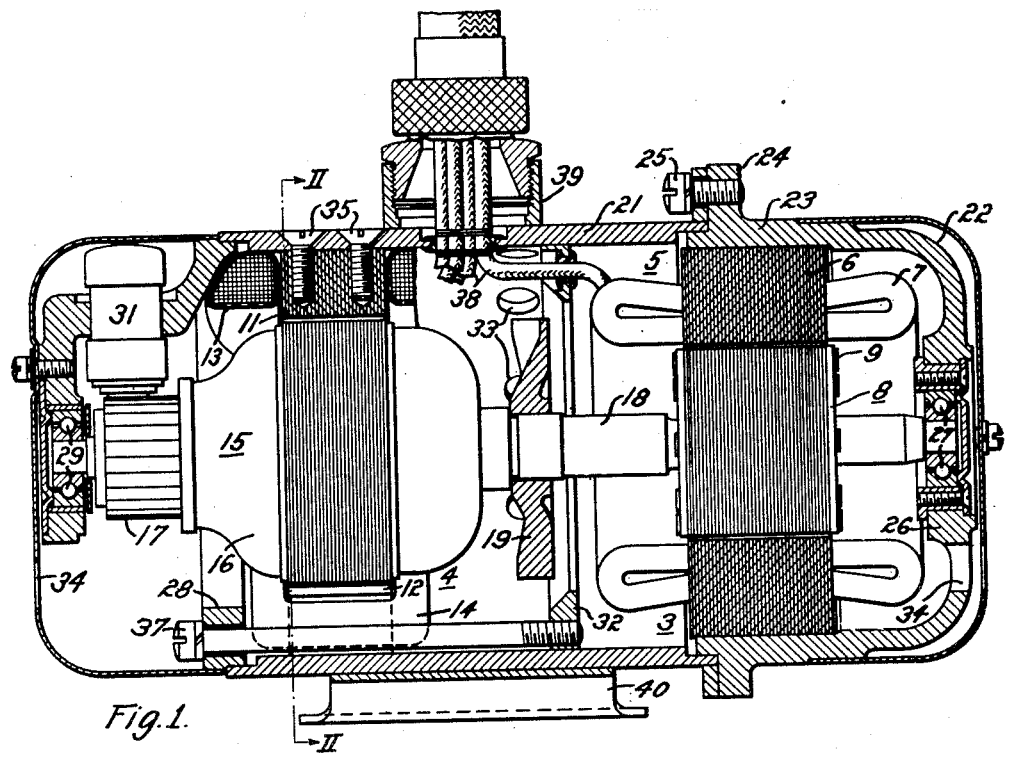

Dec. 30, 1947.  L. C. PACKER  2,433,390
MOTOR-GENERATOR
Filed Nov. 16, 1944

WITNESSES:
Wm. B. Sellers.

INVENTOR
Lewis C. Packer.
BY O. D. Buchanan
ATTORNEY

Patented Dec. 30, 1947

2,433,390

UNITED STATES PATENT OFFICE 2,433,390

MOTOR-GENERATOR

Lewis C. Packer, Longmeadow, Mass., assignor to Westinghouse Electric Corporation, East Pittsburgh, Pa., a corporation of Pennsylvania Application November 16, 1944, Serial No. 563,658

2 Claims. (Cl. 171—123)

My invention relates to electric-machine-sets, comprising two dynamo-electric machines mounted in a rigid tubular frame which can be supported in a horizontal position, with a single support at only one point along the length of the frame, and which has sufficient strength and ruggedness to withstand severe shocks. More specifically, my invention relates to a motor-generator set, comprising a small three-phase two-pole 60-cycle motor driving a two-pole direct-current generator having interpoles to improve commutation and brush-life, and adapted to be operated with variable excitation so as to produce a variable voltage suitable for energizing a direct-current servo-motor.

The principal objects of my invention are to provide a two-bearing motor-generator set having improved ventilation, having a steel frame-portion for the direct-current end of the set, so as to serve as a yoke-member having a permeability better than iron, the pole-pieces of the generator being secured within this steel yoke-member, the main poles being of laminated steel, and the interpoles being of sintered steel, both sets of pole-pieces having a permeability better than iron. The high permeability contributes to a considerable reduction in the size of the generator. The laminated and sintered construction causes the generator to have a much lower time-constant than would be the case with solid pole-pieces.

Figure 2:
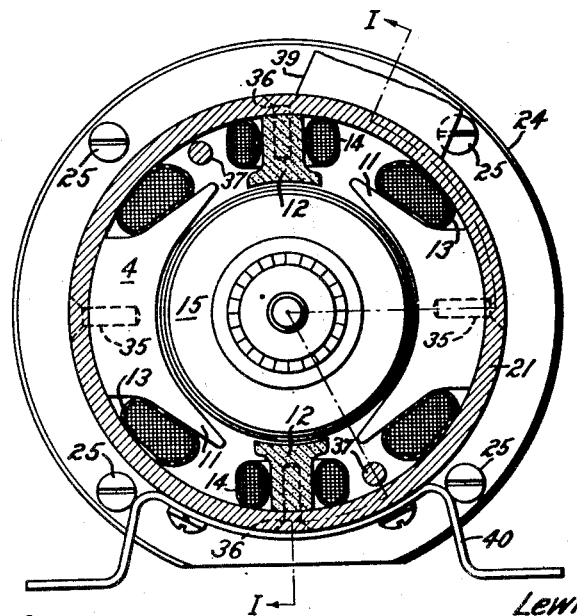

In the drawing,

Figure 1 is a longitudinal sectional view of a motor-generator set made in accordance with my invention, the section-planes being approximately as indicated by the broken line I—I in Fig. 2; and Fig. 2 is a transverse sectional view thereof on a plane indicated by the line II—II in Fig. 1.

As shown in the drawing, the invention consists in an electric-machine-set, comprising two dynamo-electric machines, specifically an alternating-current motor 3 and a direct-current generator 4. The motor 3 has a stator-member 5 comprising a laminated stator-core 6 carrying the primary windings 7. The motor 3 also has a rotor-member 8 having a squirrel-cage or other secondary winding 9.

The direct-current generator 4 has a stator-member comprising two main-field pole-pieces 11 and two interpoles 12, carrying field-winding exciting-coils 13 and 14 thereon. The generator 4 also has a rotor-member 15 comprising an armature member 16 and a commutator 17.

The two rotor-members 8 and 15 are mounted on a common shaft 18, the intermediate portion of which carries a fan-member 19, which is thus disposed between the two rotor-members 8 and 15.

The motor-generator set is provided with a rigid tubular steel frame 21, which extends over the generator pole-pieces 11 and 12, and also over the portion of the shaft 18 which carries the fan-member 19. Secured onto the fan-surrounding end of the tubular steel frame 21, is a cup-shaped end-bracket 22, having a cylindrical portion 23 which surrounds the motor stator-member 5, and which serves as a rigid extension of the steel frame 21, being secured thereto by means of flanges and bolts as indicated at 24 and 25, so that the two cylindrical (or other tubular) frame-portions 21 and 23 together constitute a rigid tubular frame extending over the entire motor-generator set. The cup-shaped end-bracket 22 is preferably of aluminum, or other light-weight non-magnetic material having the adequate structural strength, as it is not called upon to carry flux, the motor-flux being carried by the motor-stator core 6. The closed end-portion of the cup-shaped end-bracket 22 serves as an end-member 26, carrying a bearing 27 for rotatably supporting that end of the shaft 18.

At the other end of the set, that is, at the direct-current end, there is provided a second end-member, in the form of an end-bracket 28 which also carries a bearing 29 for rotatably supporting that end of the shaft 18. The end-bracket 28 also carries the brushholders 31 which cooperate with the commutator 17.

According to my invention, the tubular steel frame 21 is provided with a ring 32 which is rigidly disposed, inside of said frame, in proximity to the outer periphery of the fan-member 19, and preferably on the far side of the fan-member; that is, the ring 32 is axially displaced to one side of the fan-member 19, on the side of said fan-member toward the alternating-current motor 3. The frame 21 is provided with a plurality of outlet ventilating ducts or holes 33 which are radially opposite to the fan-member 19, so that the radial blast of air (or other ventilating-medium) which is discharged from the fan-member 19 moves radially outwardly through said outlet-ducts 33 in the frame.

The motor-generator set is provided with one or more intake ventilating ducts or holes 34 at each end of the set, so that the ventilating-air is drawn in, at the generator end, by the direct action of the fan 19, and discharged through the outlet-ducts 33. The disposition of the ring 32 is such that it acts as a baffle, in cooperation with the fan 19, so as to assist in this flow of ventilating air for the generator. The disposition of the baffle-ring 32 is such that a slight space is provided between its inner periphery and the outer periphery of the fan 19, so that the ventilation of the alternating-current motor 3 is obtained by suction from the blast of the generator-ventilating fan 19, this motor-ventilating air being drawn in through the motor, and out with the radially flowing blast of air which moves from the fan 19 to the outlet ducts 33.

It is an important feature of one phase of my invention that the tubular steel frame 21 serves as a yoke-member for the generator stator-member, that is, for completing the circumferential magnetic path around the generator pole-pieces 11 and 12. It is also a significant part of my invention, that both this yoke-member, or frame 21, and the main and interpole pole-pieces 11 and 12 are made of a material having a permeability higher than iron. This high-permeability material is chosen so as to reduce the necessary cross-sections of the magnetic circuits of the direct-current generator, thus reducing the size of the generator-end of the motor-generator set.

Since the generator 4 is utilized as a variable-voltage control-purpose generator, in the illustrated embodiment of my invention, it is essential, also, that the generator shall have a small time-constant; and to this end, the main pole-pieces 11 of the generator are made up of steel punchings or laminations, which are secured within the frame 21 by set-screws 35. The interpoles 12 of the generator were too small to be built of laminations or punchings which are secured within the frame 21 by set-screws, because the set-screws would be almost as large as the shanks of the interpoles, and hence I have utilized a sintered-steel construction for the interpoles, as indicated in the drawing, these interpoles being secured within the frame 21 by set-screws 36.

This use of laminated and sintered pole-pieces makes the generator have a time-constant which is much smaller than would be the case if solid iron or steel pole-pieces had been utilized. It is true that the solid steel frame 21 increases the time-constant somewhat, but even with this solid steel frame, it has been possible to obtain an overall time-constant of .003 second for the generator, which is sufficiently fast for the particular purpose which I had in mind, and which enables me to utilize a smaller frame than would have been possible if I had provided a laminated yoke-member for my generator. I believe that this combination of cylindrical steel frame or yoke-member, and pole-pieces which are some of them laminated and some of them sintered, is a novel combination.

As described, and more broadly claimed in my copending application Serial No. 563,657, filed November 16, 1944, the generator-end bracket 28 is held onto the frame 21 by a plurality of axially extending bolts 37, or other tension-means, anchoring in the ring 32, so that the ring thus serves the additional function of providing an abutment-means for the fastening-means 37 for the end-bracket 28.

The terminal-leads 38 for the entire motor-generator set are brought out through a conduit-fitting 39, which is rigidly secured to the frame 21, as by brazing.

A motor-generator set, constructed in accordance with my invention, is extremely rugged and rigid, so that it may be supported at any convenient place, and will be able to withstand severe shocks. In the illustrated embodiment of the invention, the motor-generator set is mounted in a horizontal position, balanced about an intermediate support, in the form of feet 40 which are secured to the steel frame 21.

I claim as my invention:

1. A motor-generator set, comprising a rigid tubular frame, an alternating-current dynamo-electric machine and a direct-current dynamo-electric machine mounted within said frame, one at each end, each machine comprising a stator-member and a rotor-member, a common shaft for the two rotor-members, a fan-member carried by the part of the shaft between the two rotor-members, a ring rigidly disposed inside of said frame in proximity to the outer periphery of said fan-member whereby said ring serves as a baffle for controlling the flow of ventilating-medium produced by said fan-member, and an end-member disposed at each end of the frame, each end-member carrying a bearing for rotatably supporting said shaft, said set having one or more intake ventilating ducts at each end, and having one or more outlet ventilating ducts in an intermediate position in said frame for discharging the ventilating medium discharged by said fan-member, the portion of the rigid tubular frame at the alternating-current end of the set being separate from the portion of the frame at the direct-current end, at least the portion of the rigid tubular frame surrounding the direct-current machine and the fan-member being of a thin-walled material having a permeability higher than iron, the direct-current stator-member which is mounted within this portion of the frame comprising a plurality of separate pole-pieces, each of a material having a permeability higher than iron, means for securing said pole-pieces within said frame, and a plurality of axially disposed tension-members between the ring and the end-member at the direct-current end of the set for holding said end-member in place.

2. A direct-current dynamo-electric machine having a rigid tubular frame of a material having a permeability higher than iron, a plurality of separate pole-pieces mounted within said frame, each pole-piece being of a material having a permeability higher than iron, said pole-pieces being of two different kinds, one kind being of a laminated construction and the other kind being of a sintered construction, exciting-coils on said pole-pieces, means for securing said pole-pieces within said frame, a rotor-member disposed within said pole-pieces, said rotor-member including a shaft, and end-member means, carried by the frame, carrying a bearing for rotatably supporting said shaft.

LEWIS C. PACKER.

REFERENCES CITED

The following references are of record in the file of this patent:

UNITED STATES PATENTS

| Number | Name | Date |
|---|---|---|
| 2,085,275 | Schmidt | June 29, 1937 |
| 1,405,965 | Bunch | Feb. 7, 1922 |
| 1,654,305 | Nottage | Dec. 27, 1927 |
| 2,224,934 | Schuhmacher | Dec. 17, 1940 |
| 2,235,075 | Kimball | Mar. 18, 1941 |

FOREIGN PATENTS

| Number | Country | Date |
|---|---|---|
| 203,885 | Germany | Oct. 31, 1908 |
| 103,885 | Australia | May 3, 1938 |